United States Patent
Cypher et al.

(10) Patent No.: US 7,739,456 B1
(45) Date of Patent: Jun. 15, 2010

(54) METHOD AND APPARATUS FOR SUPPORTING VERY LARGE TRANSACTIONS

(75) Inventors: Robert E. Cypher, Saratoga, CA (US); Shailender Chaudhry, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 640 days.

(21) Appl. No.: 11/715,312

(22) Filed: Mar. 6, 2007

(51) Int. Cl.
*G06F 12/16* (2006.01)
(52) U.S. Cl. .................................................. 711/145
(58) Field of Classification Search ................. None
See application file for complete search history.

(56) References Cited

U.S. PATENT DOCUMENTS

| | | | | |
|---|---|---|---|---|
| 7,293,161 B1* | 11/2007 | Chaudhry et al. | ........... | 712/216 |
| 7,484,080 B2* | 1/2009 | Chaudhry et al. | ........... | 712/225 |
| 7,523,266 B2* | 4/2009 | Chaudhry et al. | ........... | 711/141 |
| 2001/0014941 A1* | 8/2001 | Akkary et al. | ............... | 712/228 |

* cited by examiner

*Primary Examiner*—Denise Tran
(74) *Attorney, Agent, or Firm*—Park, Vaughan & Fleming LLP; Anthony P. Jones

(57) ABSTRACT

One embodiment of the present invention provides a system that executes a transaction on a multi-threaded processor. The system starts by executing the transaction in a "transaction-pending mode," which involves placing load-marks or store-marks on cache lines loaded from or stored to during transaction-pending mode and also buffers store operations in a store queue. Upon encountering a store queue overflow, the system continues to execute the transaction in a "store-queue-overflow mode," which involves placing load-marks or store-marks on cache lines loaded from or stored to during store-queue-overflow mode and discards store data which does not fit into the store queue during store operations. Upon completing the transaction in the store-queue-overflow mode, the system re-executes the transaction in a "repeating-transaction mode," which involves executing the instructions in the transaction non-speculatively, which allows the store operations to commit to the memory hierarchy.

21 Claims, 13 Drawing Sheets

METHOD AND APPARATUS FOR SUPPORTING VERY LARGE TRANSACTIONS

BACKGROUND

1. Field of the Invention

The present invention relates to the design of computer systems. More specifically, the present invention relates to a technique that facilitates performing very large transactions within a transactional memory system.

2. Related Art

A key problem in implementing transactional memory is the problem of buffering either the new or the old values of memory locations which are written to during the transaction. During the execution of a transaction, it is unknown whether or not the transaction will commit or fail (for example, due to resource limitations or memory conflicts). As a result, existing transactional memory designs buffer store values (in a store buffer or a cache) without overwriting copies of the old values. Alternatively, they can buffer the old values and prevent other threads from seeing the new values. In both alternatives the new values are not visible to other threads until the transaction commits, at which point the new values are made visible, or until the transaction fails, at which point the old values are restored.

For example, the UTM protocol proposed by Ananian et al. buffers the old values in a data structure stored in memory (see C. S. Ananian, K. Asanovi c, B. Kuszmaul, C. Leiserson, and S. Lie, *Unbounded Transactional Memory*, Proceedings of the 11th International Symposium on High-Performance Computer Architecture (HPCA '05), 2005). Similarly, the LogTM protocol proposed by Moore et al., buffers new values in a private cache, and when this cache overflows, buffers old values of the overflowed cache lines in a data structure stored in memory (see K. Moore, J. Bobba, M. Moravan, M. Hill & D. Wood, *LogTM: Log-based Transactional Memory*, 12th Annual International Symposium on High Performance Computer Architecture (HPCA-12), 2006). Moreover, the transactional memory protocol described in a pending U.S. patent application entitled "Facilitating Efficient Transactional Memory and Atomic Operations via Cache Line Marking," by the same inventors as the instant application, having Ser. No. 11/655,569, and filing date 18 Jan. 2007 buffers new values (i.e., values stored during a transaction) in a store queue.

Unfortunately, data structures such as store queues or buffers are necessarily bounded in size. Hence, requiring that all of a transaction's store operations fit into such a data structure limits the size of transactions that can be executed.

Hence, what is needed is a processor that supports transactional execution without the above-described limitations.

SUMMARY

One embodiment of the present invention provides a system that executes a transaction on a multi-threaded processor. The system starts by executing the transaction in a "transaction-pending mode," wherein the system places load-marks or store-marks on cache lines loaded from or stored to during transaction-pending mode and also buffers store operations in a store queue. Upon encountering a store queue overflow, the system continues to execute the transaction in a "store-queue-overflow mode," wherein the system places load-marks or store-marks on cache lines loaded from or stored to during store-queue-overflow mode and discards store data which does not fit into the store queue during store operations. Upon completing the transaction in the store-queue-overflow mode, the system re-executes the transaction in a "repeating-transaction mode," during which the system executes the instructions in the transaction non-speculatively, and in doing so allows the store operations to commit to the memory hierarchy.

In a variation of this embodiment, when transitioning to repeating-transaction mode, the system discards store operations from the store queue that were buffered during transaction-pending mode or store-queue-overflow mode and restores a register state and a program counter (PC) from the start of the transaction.

In a variation of this embodiment, upon completing the transaction in repeating-transaction mode, the system removes the load-marks and store-marks placed on cache lines during transaction-pending mode and store-queue-overflow mode.

In a variation of this embodiment, when aborting the transaction, the system: (1) discards the stores in the store queue that are associated with transaction-pending mode or store-queue-overflow mode; (2) removes load-marks and store-marks from cache lines marked during transaction-pending mode or during store-queue-overflow mode; and (3) commences execution from a fail-program-counter associated with the transaction.

In a variation of this embodiment, the system aborts the transaction if a load-mark or store-mark cannot be set on a cache line during transaction-pending mode or during store-queue-overflow mode.

In a variation of this embodiment, the system stores the address of load-marked and store-marked cache lines in a private buffer during transaction-pending mode and during store-queue-overflow mode and aborts the transaction if the private buffer overflows.

In a variation of this embodiment, when discarding store data in store-queue-overflow mode, the system discards new store operations and retains old store operations in the store queue.

In a variation of this embodiment, when discarding store data in store-queue-overflow mode, the system discards old store operations from the store queue and saves new store operations in the store queue.

In a variation of this embodiment, the system aborts the transaction during store-queue-overflow mode if the calculation of a destination address for a load operation or a store operation depends on a store operation that has been discarded.

In a variation of this embodiment, when a cache line is load-marked, no other thread can write to the cache line and when a cache line is store-marked, no other thread can read from or write to the cache line.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In one embodiment of the present invention, if a transaction overflows the store queue, the subsequent transaction is divided into two "phases." The first phase places load- and store-marks on the cache lines accessed by the transaction, and the second phase actually performs the transaction. If the first phase completes successfully, the second phase is guaranteed to complete successfully because conflicts with other transactions will not occur. Such conflicts will not occur because all required load- and store-marks have already been placed, which protects the marked cache lines from interfering accesses during the second phase. Furthermore, the private buffers containing load- and store-marked cache line addresses will not overflow because no additional load- or store-marks need to be placed during the second phase.

Processor

Figure 1:
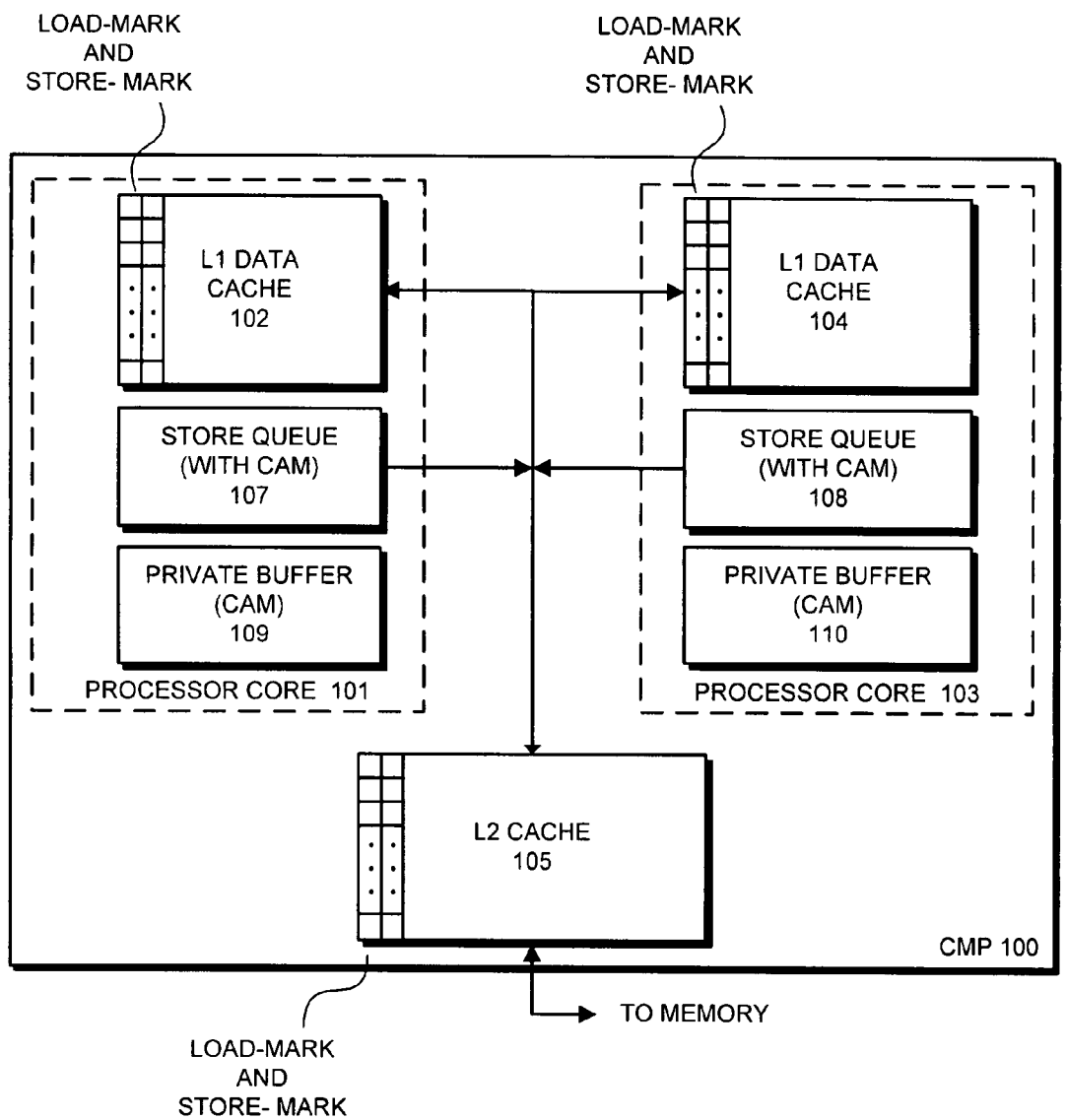
FIG. 1 illustrates an exemplary Chip Multi-Processor (CMP) system in accordance with an embodiment of the present invention.

FIG. 1 illustrates an exemplary Chip Multi-Processor (CMP) system 100 in accordance with an embodiment of the present invention. CMP system 100 is incorporated onto a single semiconductor die, and includes two processor cores, 101 and 103.

Processor cores 101 and 103 include L1 data caches 102 and 104, respectively, and they share L2 cache 105. Along with L1 data caches 102 and 104, processor cores 101 and 103 include store queues 107 and 108, which buffer pending store operations.

During a store operation, processor core 101 first performs a lookup for a corresponding cache line in L1 data cache 102. If the lookup generates a miss in L1 data cache 102, processor core 101 creates an entry for the store in store queue 107 and sends a corresponding fetch for the store to L2 cache 105. If the lookup generates a hit in the L1 data cache 102, processor core 101 creates an entry for the store in store queue 107.

During a subsequent load operation, processor core 101 uses a CAM structure to perform a lookup in store queue 107 to locate completed but not-yet-retired stores to the same address that are logically earlier in program order. For each byte being read by the load operation, if such a corresponding store exists, the load operation obtains its value from store queue 107 rather than from the memory subsystem.

Processor cores 101 and 103 additionally include private buffers 109 and 110, which maintain copies of addresses of load-marked and store-marked cache lines to facilitate efficient lookups of theses addresses. When a thread needs to load from or store to a cache line, that thread first checks its private buffer to determine if the thread has already load-marked or store-marked the cache line.

In addition, cache lines contained in L1 data caches 102 and 104, L2 cache 105, and in the memory (not shown) can include load-marks and store-marks in metadata associated with the cache line. When a cache line is load-marked by a thread, no other threads are permitted to store to the cache line, thereby preventing another thread from overwriting a value in the cache line. On the other hand, when a cache line is store-marked by a thread, the store-mark prevents another thread from loading the value from or storing a value to the cache line, thereby providing the store-marking thread with exclusive access to the cache line. We refer to the process of placing such marks on a cache line as either "load-marking" or "store-marking" the cache line. Both types of marking are described in more detail in the following sections of this disclosure.

Note that a load-mark prevents any other thread from writing to the cache line but not from reading from the cache line, so multiple threads can place load-marks in the metadata for a cache line (i.e., multiple threads can be reading from the cache line simultaneously). Hence, in one embodiment of the present invention, each cache line's metadata includes a "reader count" value that keeps track of how many threads have placed load-marks on the cache line. When multiple threads have load-marked the cache line, other threads are prevented from writing to the cache line until all of the threads have removed their load-marks.

In addition, when a thread has placed a load-mark on a cache line, the thread can perform any number of loads from the cache line. In other words, as long as a load-mark is set on the cache line, the marking thread may freely load the value from the cache line. The store-mark functions in the same way for stores to the cache line.

Load-Marking

The Load-Mark Request Operation

Figure 2A:
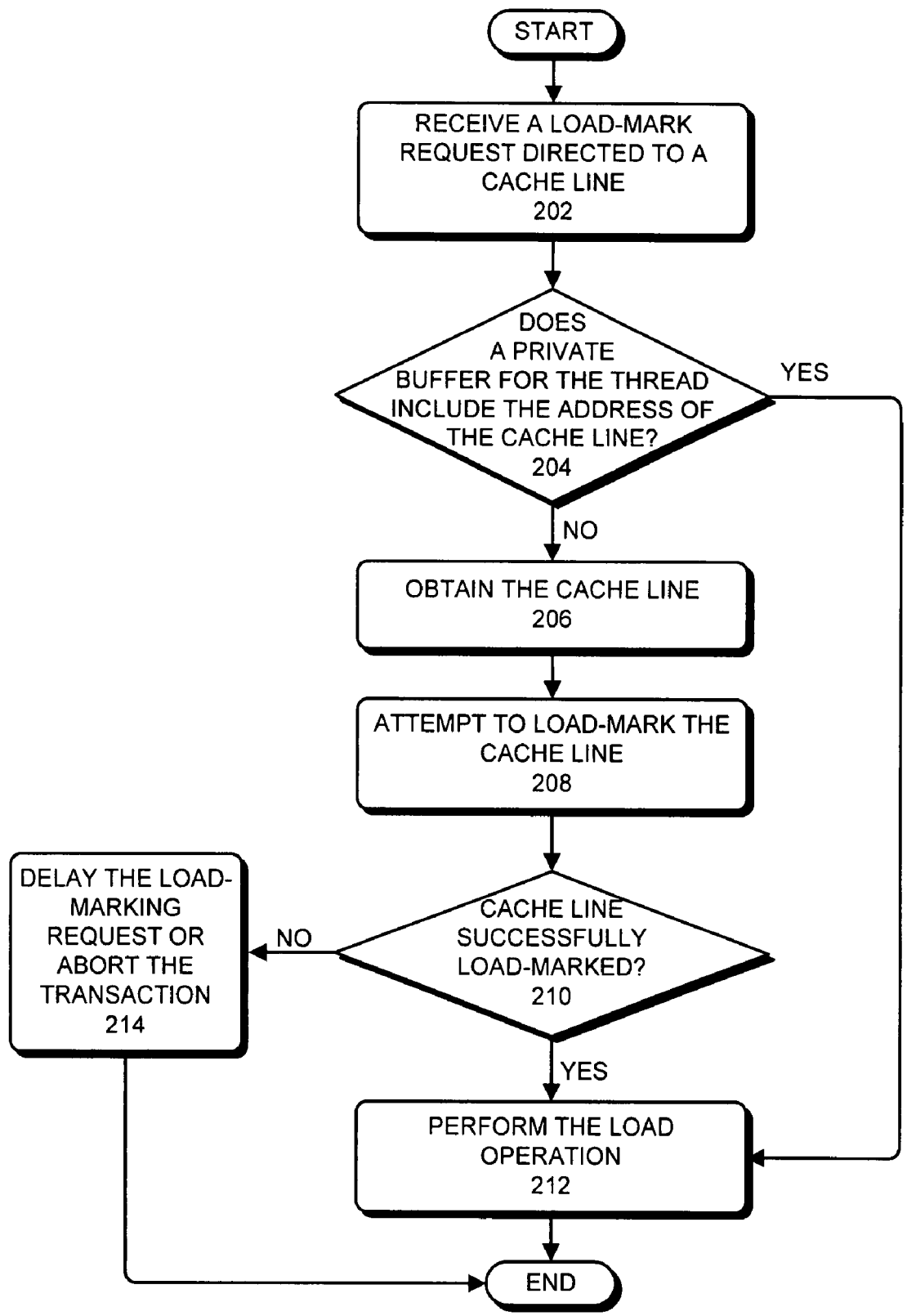
FIG. 2A presents a flowchart illustrating the process of performing a load-mark request operation in accordance with an embodiment of the present invention.

FIG. 2A presents a flowchart illustrating the process of performing a load-mark request operation in accordance with an embodiment of the present invention. Note that the load-mark request includes two operations; the load-marking operation and the load operation. When a load-mark request is handled, the system first attempts the load-marking operation. Upon successfully concluding the load-marking operation, the system automatically returns the cache line, thereby completing the load operation.

The process starts when the system receives a load-mark request from a thread, wherein the load-mark request is directed to a cache line (step 202). Next, the system checks a private buffer associated with the thread to determine whether the thread has already load-marked the cache line (step 204). Specifically, the system performs a lookup in the thread's private buffer based on the address of the load operation to locate a corresponding address for a load-marked cache line. If the private buffer contains a corresponding address, the thread has already load-marked the cache line and the thread can proceed with the load operation (step 212).

If the private buffer does not contain the corresponding address, the thread has not yet load-marked the cache line. In this case, the system then obtains the cache line (step 206) and attempts to load-mark the copy of the cache line in the local cache (step 208).

If load-marking is successful (step 210), the system performs the load operation (step 212). Otherwise, if the load-marking is unsuccessful, the system retries the load-mark request after a delay. In one embodiment of the present invention, the load-mark request is retried a predetermined number of times, and if the load-mark request remains unsuccessful, the transaction is aborted (step 214).

Figure 2B:
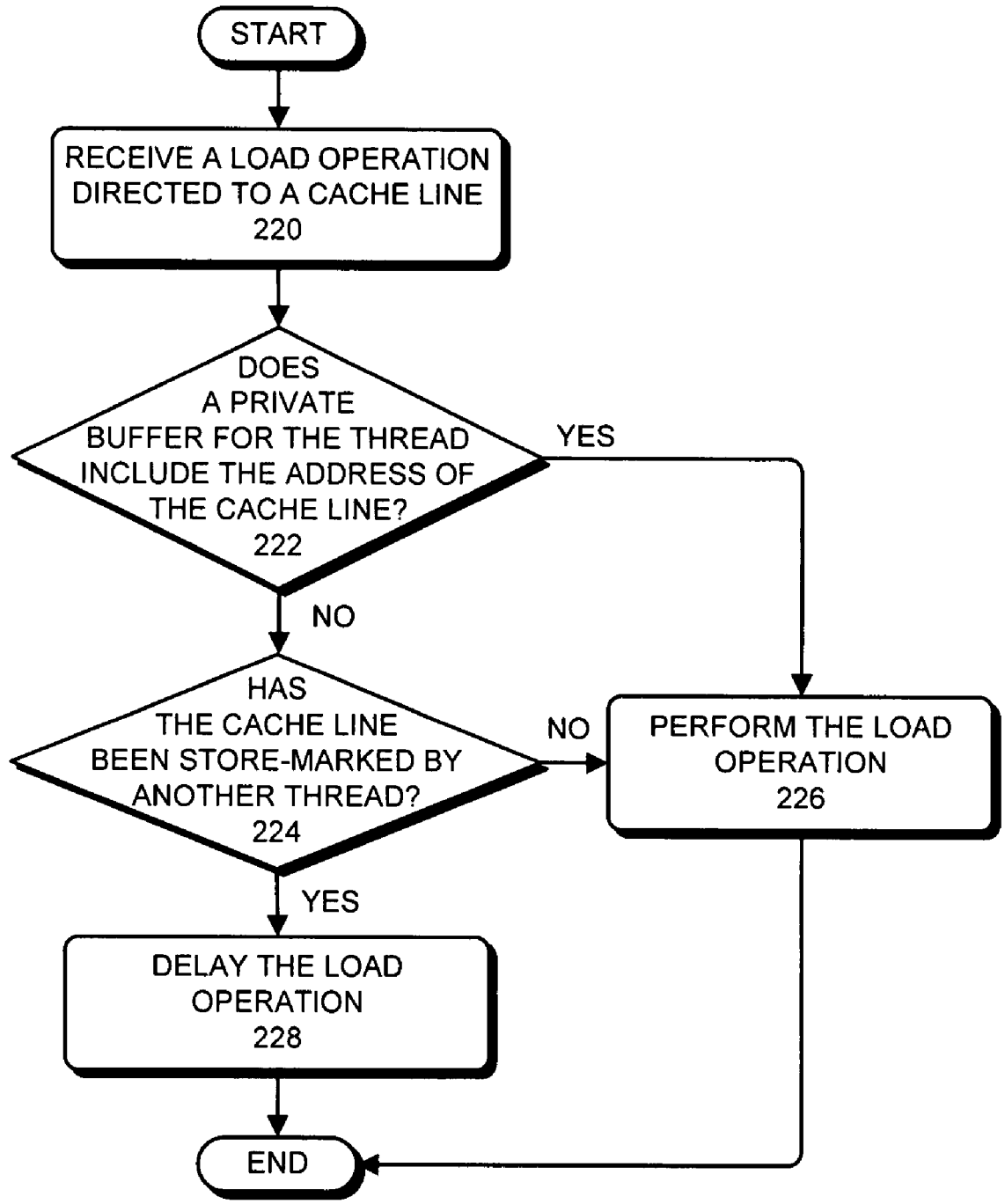
FIG. 2B presents a flowchart illustrating the process of performing a load operation without load-marking the cache line in accordance with an embodiment of the present invention.

FIG. 2B presents a flowchart illustrating the process of performing a load operation without load-marking the cache line in accordance with an embodiment of the present invention. The process starts when the system receives a load operation from a thread, wherein the load operation is directed to a cache line (step 220).

Next, the system checks a private buffer associated with the thread to determine whether the thread has already load-marked the cache line (step 222). Specifically, the system performs a lookup in the thread's private buffer based on the address of the load operation to locate a corresponding address for a load-marked cache line. If the private buffer contains a corresponding address, the thread has already load-marked the cache line and the system performs the load operation (step 226).

If cache line's address is not in the private buffer, the system determines if the cache line has been store-marked by another thread (step 224). If so, the thread cannot load the cache line and the load operation is retried after a delay (step 228). Otherwise, the system performs the load operation (step 226).

Attempting to Load-Mark the Cache Line

Figure 3:
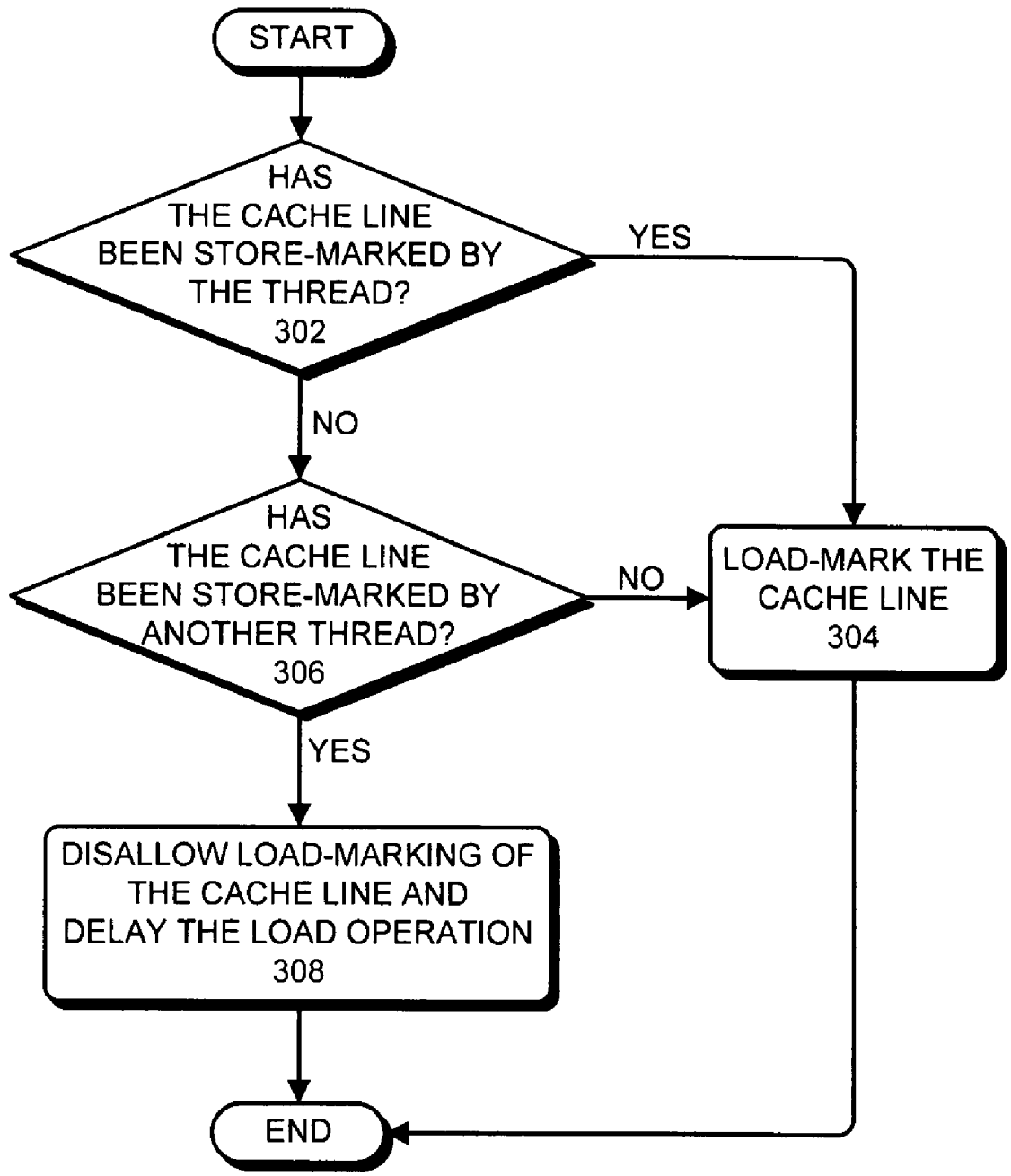
FIG. 3 presents a flowchart illustrating the process of attempting to load-mark the cache line in accordance with an embodiment of the present invention.

FIG. 3 presents a flowchart illustrating the process of attempting to load-mark the cache line in accordance with an embodiment of the present invention. During this process, the system first determines whether the cache line has been store-marked by the thread (step 302). Specifically, the system checks a store-mark buffer which maintains addresses of cache lines which have been store-marked by the thread to see if the address of the cache line exists in the store-mark buffer.

If the cache line has been store-marked by the thread, no other thread is permitted to load-mark the cache line (because of the exclusive property of store-marks). However, the thread may itself place a load-mark on a cache line that the thread has already store-marked. Hence, in this case, the system load-marks the cache line (step 304).

On the other hand, if the system determines that the cache line has not been store-marked by the thread, the system next determines if the cache line has been store-marked by another thread (step 306). If so, the thread cannot load-mark the cache line and the load operation is delayed (step 308). Otherwise, the system knows that the cache line has not been store-marked by any thread and the system proceeds to load-mark the cache line for the thread (step 304).

Figure 4:
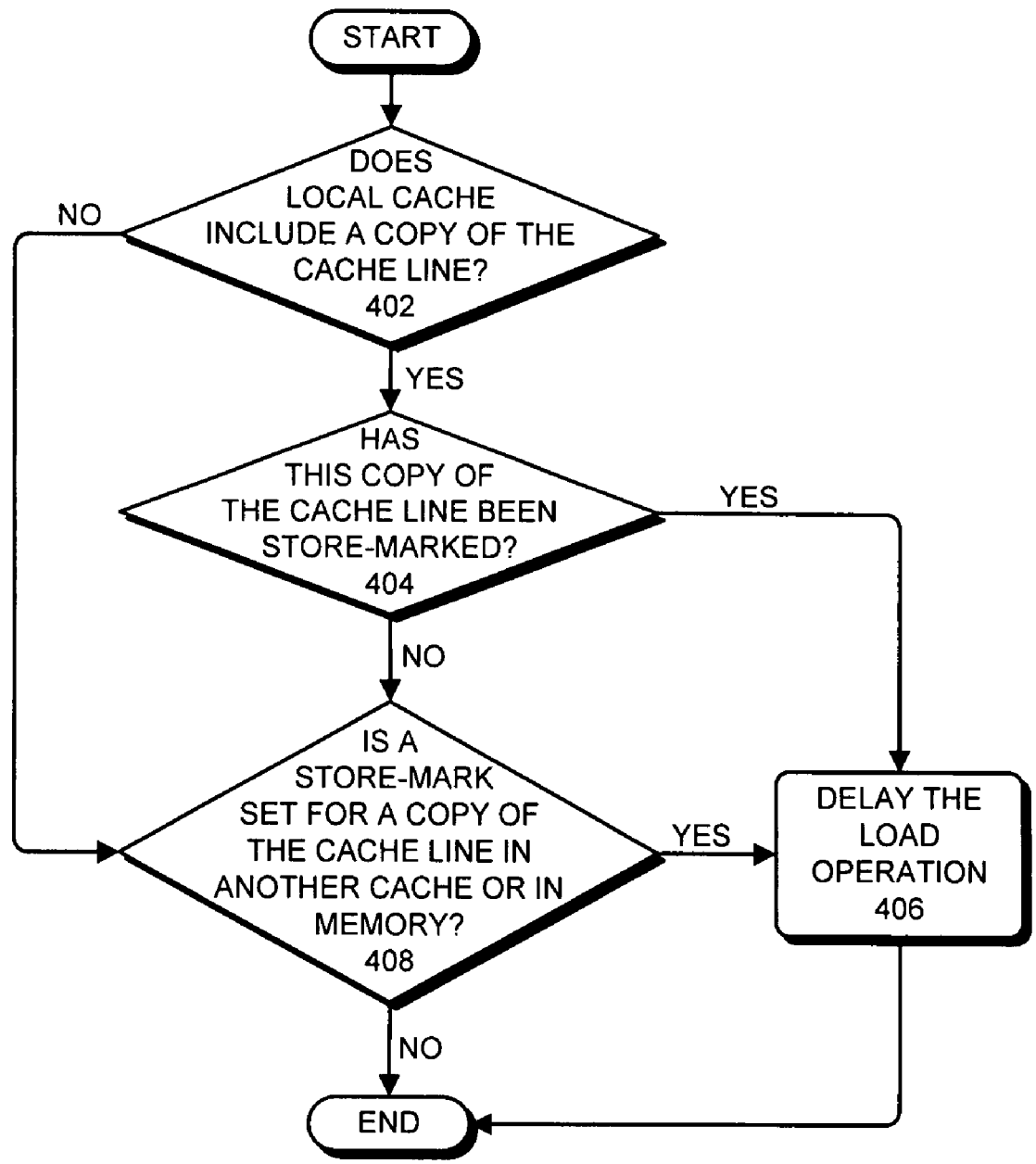
FIG. 4 presents a flowchart illustrating the process of determining whether the cache line has been store-marked by another thread in accordance with an embodiment of the present invention.

FIG. 4 presents a flowchart illustrating the process of determining whether the cache line has been store-marked by another thread in accordance with an embodiment of the present invention. During this process, system first checks in the thread's local cache for a copy of the cache line (step 402). If the system finds a copy of the cache line in the thread's local cache, the system examines the store-mark in the copy of the cache line to determine whether the cache line has been store-marked by another thread (step 404). If so, the cache line cannot be load-marked and the load operation is delayed (step 406).

On the other hand, if there is no valid copy of the cache line in the local cache, the system determines whether the store-mark has been set in another copy of the cache line which exists in another cache or in memory (step 408). If so, the cache line has been store-marked by another thread, which means the cache line cannot be load-marked, and the load operation is delayed (step 406).

Store-Marking

The Store-Marking Operation

Figure 5A:
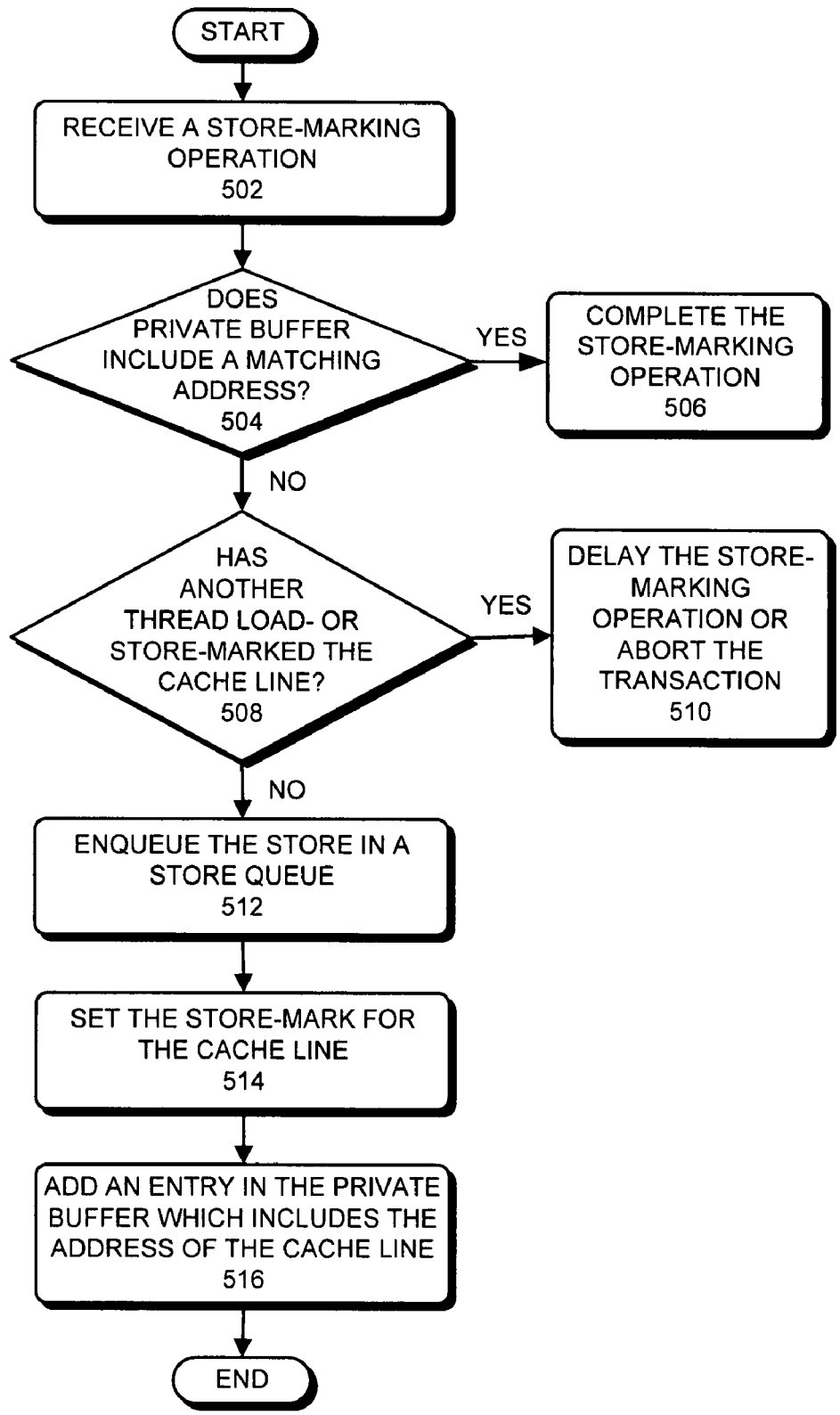
FIG. 5A presents a flowchart illustrating the process of performing a store-marking operation in accordance with an embodiment of the present invention.

FIG. 5A presents a flowchart illustrating the process of performing a store-marking operation in accordance with an embodiment of the present invention. The system first receives a store-marking operation which is directed to a cache line (step 502).

Next, the system checks the thread's private buffer 109 to determine whether the thread has already store-marked the cache line (step 504). Specifically, the system performs a lookup in the thread's private buffer based on the address of the memory reference to locate a corresponding address for a store-marked cache line. If the private buffer contains a corresponding address, the thread completes the store-marking operation (step 506).

If, however, the private buffer does not contain a matching address, the system determines whether the cache line has been store-marked or load-marked by another thread (step 508). During this process, the system first checks in the thread's local cache for a copy of the cache line. If the system finds a copy of the cache line, the system examines the load-mark and store-mark to determine whether the cache line has been load-marked or store-marked by another thread. If the store-mark in the copy of the cache line is not set, the system determines whether the store-mark has been set in another copy of the cache line which exists in another cache or in memory. If a store-mark is set in either location, the store-marking operation is delayed and retried (step 510). On the other hand, in order to determine that no other thread has placed a load-mark on the cache line, the system verifies that either (1) there are no load-marks on the line, or (2) there is exactly one load-mark on the line, and this thread is the one that placed that load-mark on the line (the system can verify this by finding the address of the cache line in the thread's private buffer of cache lines that the thread has load-marked). If there is a load-mark set by another thread on the cache line, the store-marking operation is delayed and retried (step 510). In one embodiment of the present invention, the store-marking operation is retried a predetermined number of times, and if the store-marking operation continues to be unsuccessful, the transaction is aborted (step 510).

Note that the system can use a cache-coherence mechanism to determine whether another cache or the memory holds a store-marked or load-marked copy of the cache line. This can involve sending an exclusive access request for the cache line to the other caches. If successful, the exclusive access request returns the cache line including store-mark status and the load-mark reader count. In one embodiment of the present invention, if the cache line has been store-marked in another cache, the system receives a NACK signal from the other cache which causes the request to fail, in which case the memory operation can be retried. In this embodiment, however, if the system does not receive a NACK signal, the system can then obtain exclusive (writable) access to that cache line provided no other thread has load-marked the cache line.

Note that in order to perform a memory operation, it may be necessary to use the cache coherence protocol to obtain a copy of the cache line in a suitable state in the local cache. For example, if the memory operation is a load, it may be necessary to obtain a copy of the cache line in the shared (S), exclusive (E), owned (O), or modified (M) state. Similarly, if the memory operation is a store, it may be necessary to obtain a copy of the cache line in the E or M state (and if it is in the E state, it may be necessary to change it to the M state upon performing the store). If the cache coherence protocol is used to obtain a copy of the cache line in the E or M state, the request for this copy may differ from the exclusive access request mentioned in the preceding description. This is because the thread performing the store has already placed a store-mark on the cache line, and thus the request should not receive a NACK signal.

If a store-mark or load-mark is not set in another cache or in memory, the system enqueues the store operation in store queue 107 (step 512). The system then sets the store-mark for the cache line (step 514) and adds the address of the cache line to the private buffer (step 516). Note that this entry remains in the private buffer until subsequent changes are made to the state of the cache line, such as removing the store-mark.

In one embodiment of the present invention, when a thread performs one or more stores to a store-marked cache line, the last of the stores can include a flag indicating that the store-mark should be cleared. When such a flag is encountered, the system releases the store-marked cache line by unsetting the store-mark in a copy of the cache line in its local cache, and additionally removing the address of the cache line from its private buffer.

In one embodiment of the present invention, a thread selectively places store-marks on cache lines. In other words, the thread may reorder some stores and not reorder other stores, in which case the thread store-marks on cache lines associated with stores that are reordered, but does not have to store-mark cache lines associated with stores that are not reordered and that are not part of a transaction.

Figure 5B:
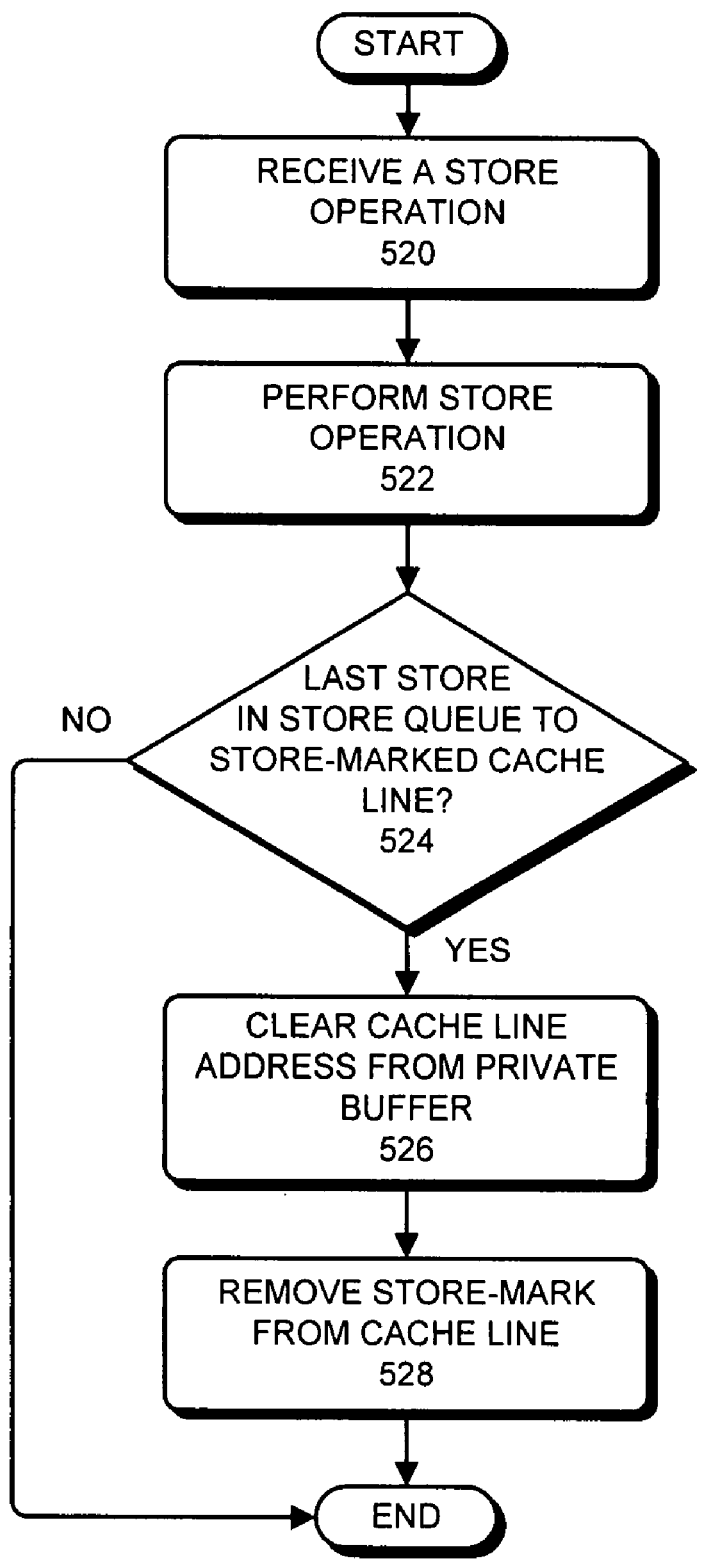
FIG. 5B presents a flowchart illustrating the process of performing a store operation for a cache line that has been store-marked in accordance with an embodiment of the present invention.

FIG. 5B presents a flowchart illustrating the process of performing a store operation for a cache line that has been store-marked in accordance with an embodiment of the present invention. The system first receives a store operation for a thread which is directed to a cache line from the store queue (step 520) and performs the store operation (step 522).

The system then determines if the store operation was the last store operation in the store queue to a store-marked cache line (step 524). If the store operation was the last store operation, the system clears the address of the store-marked cache line from the private buffer (step 526) and removes the store-mark from the cache line (step 528).

Figure 5C:
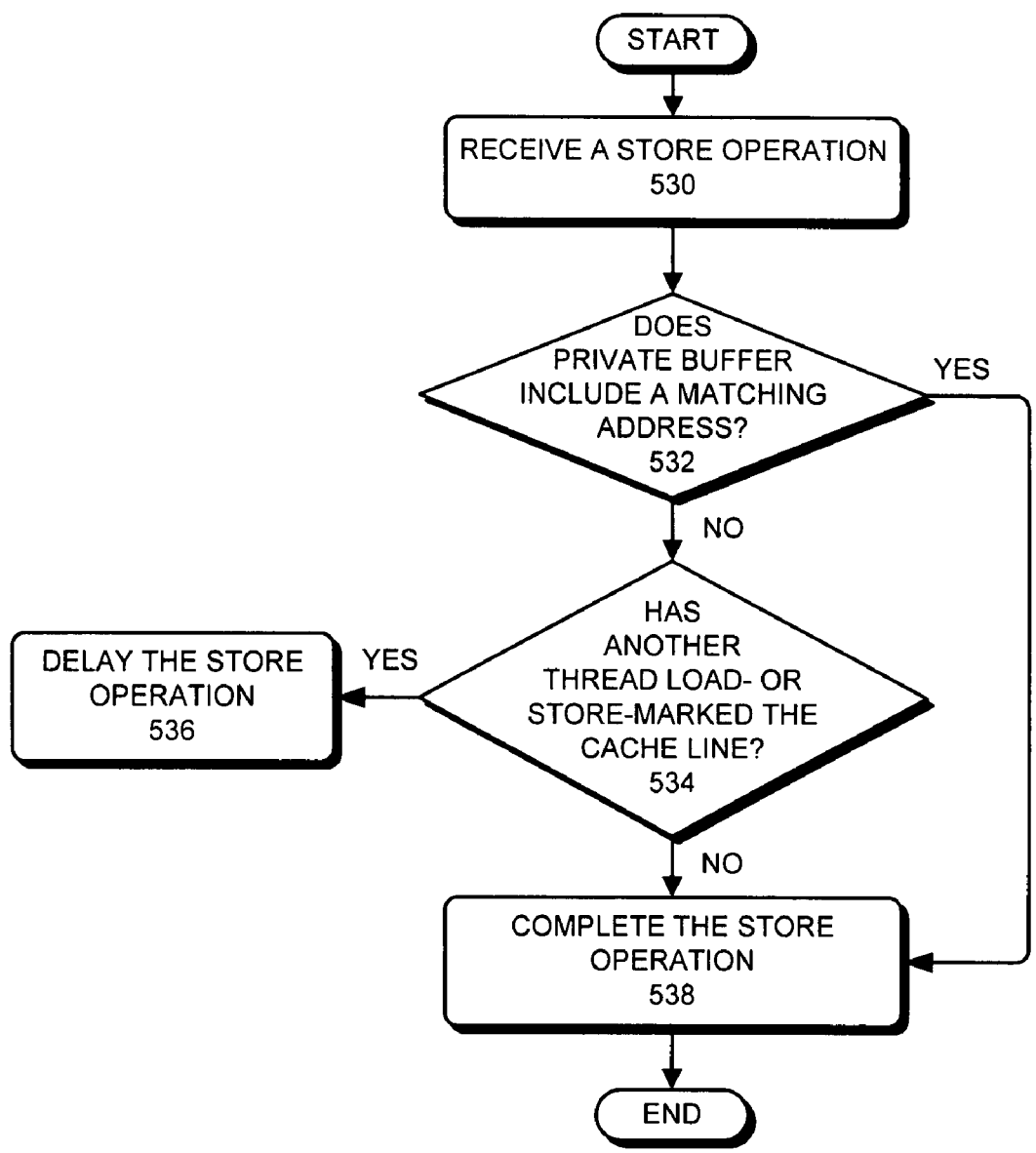
FIG. 5C presents a flowchart illustrating the process of performing a store operation for a cache line that has not been store-marked in accordance with an embodiment of the present invention.

FIG. 5C presents a flowchart illustrating the process of performing a store operation for a cache line that has not been store-marked in accordance with an embodiment of the present invention. The system first receives a store operation for a thread from the store queue which is directed to a cache line (step 530). For the purposes of illustration, we assume that the store operation was the oldest store operation in the store queue and that the store operation has not been re-ordered with respect to other store operations.

Next, the system checks the thread's private buffer 109 to determine whether the thread has already store-marked the cache line (step 532). Specifically, the system performs a lookup in the thread's private buffer based on the address of the memory reference to locate a corresponding address for a store-marked cache line. If the private buffer contains a corresponding address, the thread proceeds with the store operation (step 538).

If, however, the private buffer does not contain a matching address, the thread concludes that it has not set the store-mark. If the thread has not set the store-mark, the system determines whether the cache line has been store-marked or load-marked by another thread (step 534). During this process, the system first checks in the thread's local cache for a copy of the cache line. If the system finds a copy of the cache line, it examines the store-mark to determine whether the cache line has been store-marked by another thread. If the store-mark in the copy of the cache line is not set, the system determines whether the store-mark has been set in another copy of the cache line which exists in another cache or in memory. If a store-mark is set in either location, the store operation is retried after a delay (step 536). On the other hand, in order to determine that no other thread has placed a load-mark on the cache line, the system verifies that either (1) there are no load-marks on the line, or (2) there is exactly one load-mark on the line, and this thread is the one that placed that load-mark on the line (the system can verify this by finding the address of the cache line in the thread's private buffer of cache lines that the thread has load-marked). If there is a load-mark set by another thread on the cache line, the store operation is retried after a delay (step 536).

Propagating Store-Marks and Load-Marks

In one embodiment of the present invention, the system eventually propagates the load-marks and store-marks in the metadata for a cache line to the other caches and to memory. The following sections explain the process of propagating the load-marks and store-marks. Note that we refer to the combination of load-marks and store-marks together as "metadata" for cases where load-marks and store-marks are propagated in a similar way.

Note that obtaining a copy of the cache line in the proper coherency protocol state (as detailed in the following sections) is just the first step in reading from or writing to a cache line. After the cache line has been obtained in the proper coherency protocol state, the system has to verify that the desired access can be performed and, if necessary, add a load-mark or a store-mark before performing a read or write to the cache line.

Figure 6A:
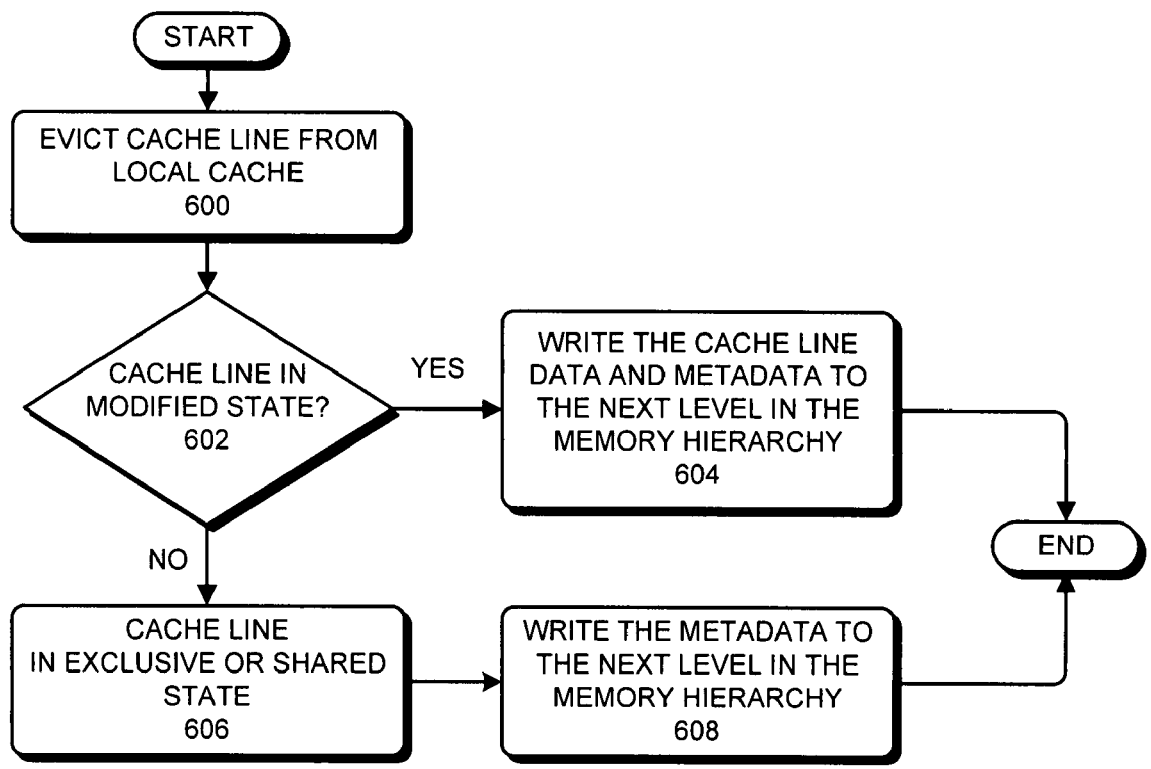
FIG. 6A presents a flowchart illustrating the process of propagating load-mark metadata for an evicted cache line in accordance with an embodiment of the present invention.

We first consider the case where a cache line is evicted from a cache as illustrated in FIG. 6A. The process starts when a cache line is evicted from a cache (step 600). The system determines if the cache line is in the modified state (step 602). If so, the system evicts the line by writing the cache line data and the metadata to the next level of the memory hierarchy (step 604).

On the other hand, if the cache line is not in the modified state, but is in the exclusive state or shared state (step 606), the system does not propagate the data in the cache line, but writes the metadata to the next level of the memory hierarchy (step 608).

Figure 6B:
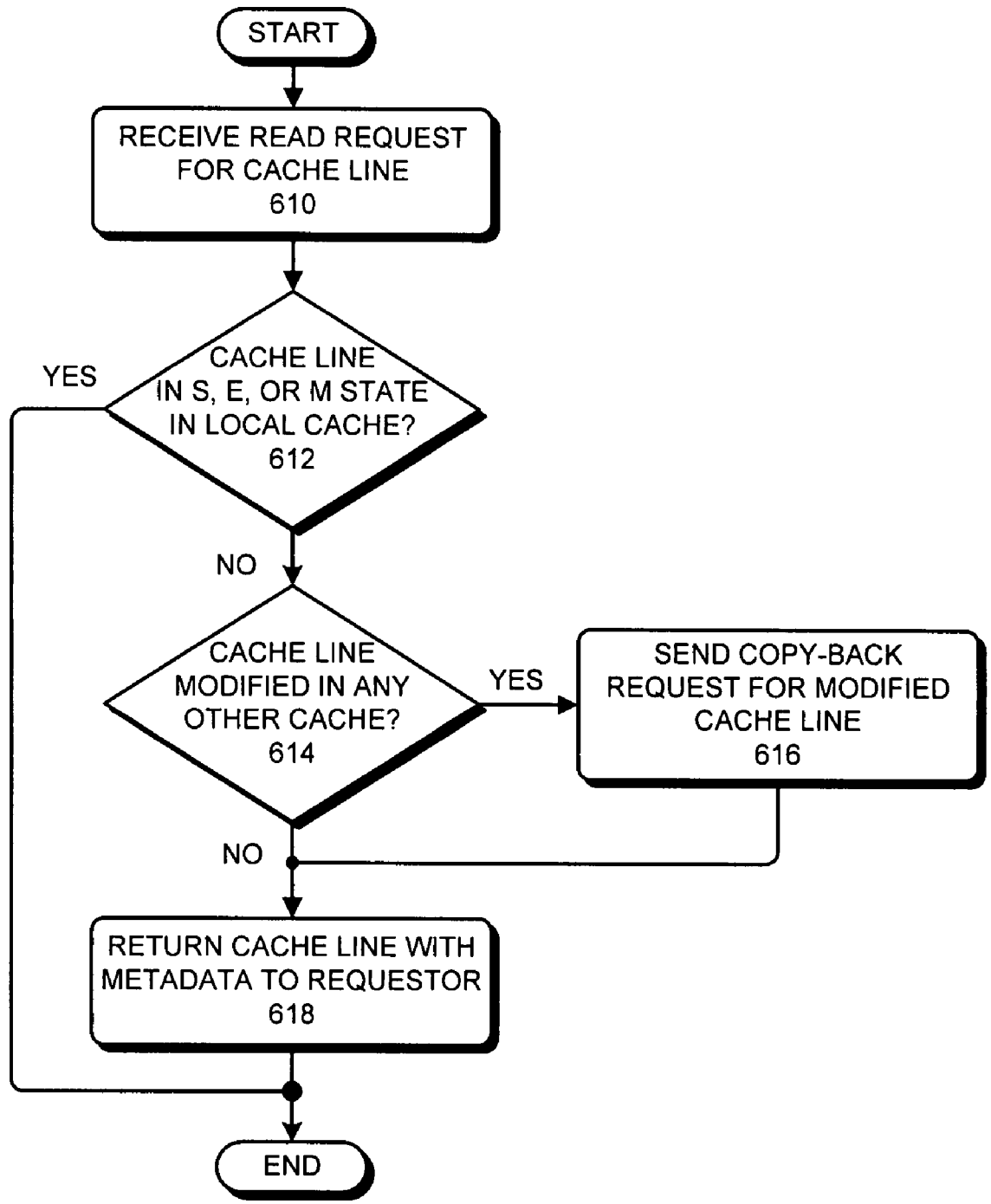
FIG. 6B presents a flowchart illustrating the process of propagating load-mark metadata for a cache line during a read operation in accordance with an embodiment of the present invention.

We next consider the case where the cache line is subject to a read operation as illustrated in FIG. 6B. The process starts when the system receives a read request for a cache line (step 610). The system first determines if the cache line is held in the shared, exclusive, or modified state the thread's local cache (step 612). If so, the thread can read the local copy of the cache line and the process is complete.

Otherwise, the system determines if the cache line is held in any other processor's cache in the modified state (step 614). If so, the system sends a copyback coherence request to that cache (step 616). Upon receiving a copyback coherence request, the processor that holds the modified copy of the cache line responds with a copy of the cache line and the metadata, which are returned to the requestor (step 618). Note that when responding to the copyback coherence request, the processor that holds the modified copy responds with a copy of the cache line, but also retains a local copy of the cache line in the shared state.

When the processor sends the load-mark in response to a copyback coherence request, the processor can partition the reader count value into two parts and can send part of the reader count value and can retain part of the reader count value. However, the sum of the sent reader count value and the retained reader count value must equal the starting reader count value in the local copy of the cache line. For example, where the reader count value in the local copy of the cache line originally indicated that there were four load marks on the cache line, the processor can send two of the load marks with the sent line, while retaining two of the load marks in the local copy of the cache line.

Figure 6C:
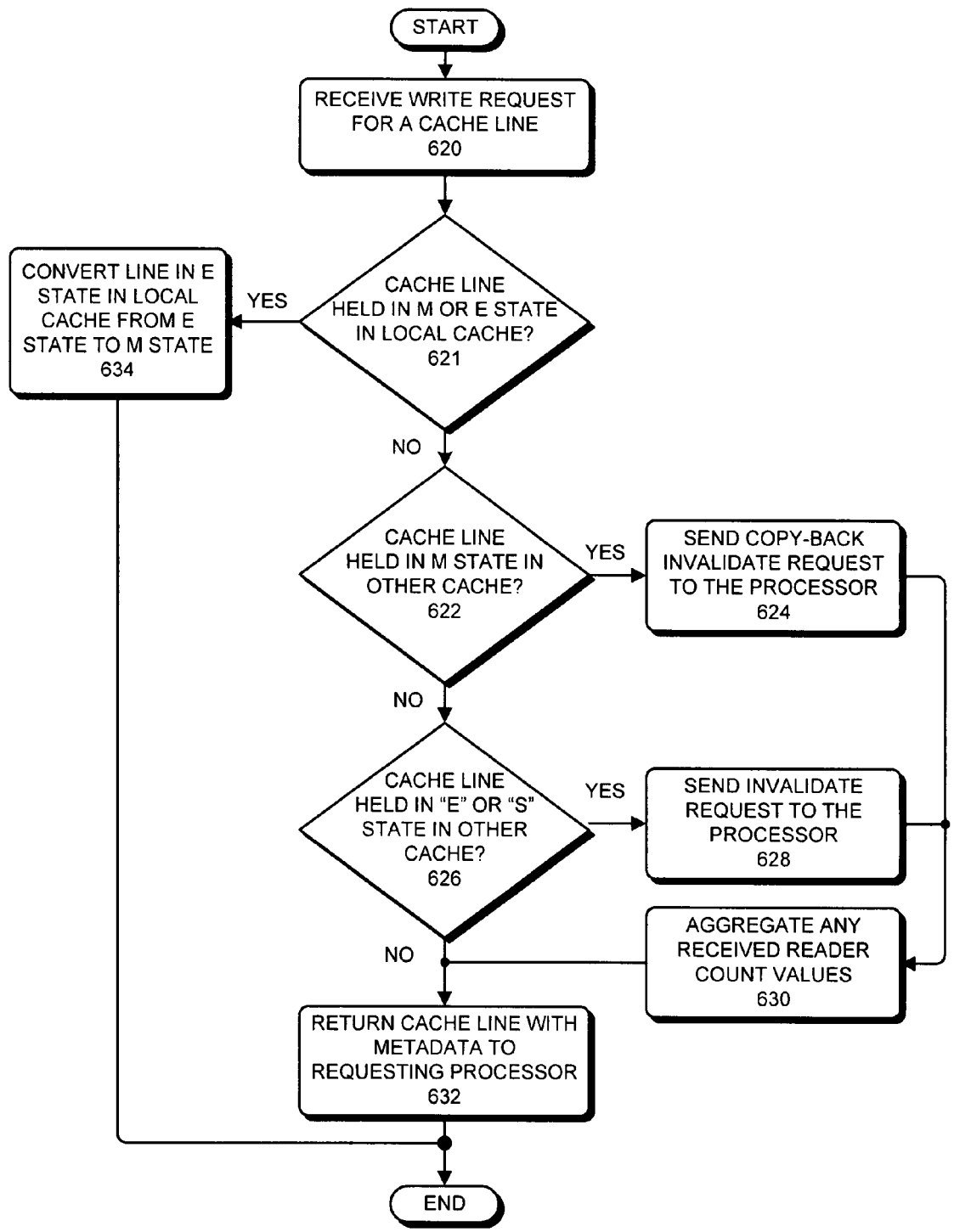
FIG. 6C presents a flowchart illustrating the process of propagating load-mark metadata for a cache line during a write operation in accordance with an embodiment of the present invention.

We next consider the case where the cache line is subject to a write request that is illustrated in FIG. 6C. Note that a thread attempting to write to the cache line first obtains a copy of the cache line in the modified state, which invalidates all copies of the line in other caches and obtains the cache line in the modified state for the requesting thread.

The process starts when the system receives a write request for a cache line (step 620). The system first determines if the cache line is held in the local cache in the modified or exclusive state (step 621). If the cache line is held in the modified state, the thread already has write access to the cache line, so the process is complete.

If the cache line is held in the exclusive state, the system can change the status of the copy of the cache line to the modified state (step 634). In order to change the status of the local copy of the cache line from the exclusive state to the modified state, the system implicitly invalidates the copy of the cache line held in the memory system. Hence, for one embodiment of the present invention, whenever a cache line is delivered to a local cache in the exclusive state, the cache line is delivered with reader count equal value to the total number of threads that have put load-marks on the cache line. In other words, when the cache line is delivered, the reader count value in the memory system is zero and all of the load-marks are included in the metadata for the local copy of the cache line. Note that the store-mark is propagated with each copy of the cache line, so no special treatment is required for the store-mark in this embodiment.

If the cache line is held in any other processor's cache in the modified state (step 622), the system sends a copyback-invalidate coherence request to that cache (step 624). Upon receiving the copyback-invalidate coherence request at a given cache that holds the copy of the cache line, the cache line data and metadata are propagated back to memory and the local copy of the given cache line in the given cache is invalidated.

On the other hand, if the system receives a write request for a cache line that is held in any other processor's cache in the exclusive state or the shared state (step 626), the system sends an invalidate coherence request to all other caches in the coherence domain that may contain a valid copy of the cache line (step 628). Upon receiving the invalidate coherence request at a given cache that holds the copy of the cache line, the metadata is propagated back to memory and the local copy of the cache line in the given cache is invalidated.

In addition, the system determines the number of load-marks that are on the copy of the cache line in memory. In one embodiment of the current invention, the system makes the determination by reading the metadata of the cache line in memory.

The system then sums load-marks in the metadata received from the other caches and from memory (step 630) and responds to the requester with a cache line, including the metadata (step 632). Hence, the copy of the line delivered to the requesting thread has a reader count value which is equal to the number of threads that have placed a load-mark on the line and a store-mark that is asserted if any other thread had asserted a local store-mark.

By propagating the metadata as described above, the system maintains the invariant that the sum of the load-marks in all valid copies of a cache line equals the total number of threads that have load-marked the line. Maintaining this invariant prevents a thread from storing to a line on which another thread has placed a load-mark.

Note that the system can use negative, as well as positive, values for reader count values. This can be helpful when a thread wants to remove a load-mark from a cache line that has been evicted from its local cache.

Using Load-Marks and Store-Marks to Support Transactional Execution Transactions Embodiments of the present invention implement transactions by maintaining a transaction state (including a "not-in-transaction" state, a "transaction-pending" state, and a "repeating-transaction" state) for each thread by buffering data from stores which occur during the transaction in the store queue. The system then either commits the transaction by performing the associated stores, or aborts the transaction by removing the associated stores from the store queue and restoring the pre-transactional state of the thread from a checkpoint generated at the start of the transaction.

The preceding sections of this disclosure describe how load-marks and store-marks can be placed on cache lines to allow an arbitrary number of reads and writes to be performed to those cache lines. The reads and writes can be placed in the memory order at any point from the placing of the corresponding load-mark or store-mark on the line to the clearing of that mark, regardless of when they were actually performed by the hardware.

Embodiments of the present invention use load-marks and store-marks to implement a transaction by requiring that: (1) the processor (or thread) places a load-mark on all lines read during the transaction; (2) the processor (or thread) places a store-mark on all lines written to during the transaction; (3) these load-marks and store-marks are all held simultaneously when the transaction commits; (4) all loads that precede the transaction in program order are either committed prior to the transaction commit or have a load-mark on the cache line when the transaction commits; and that (5) all stores that precede the transaction in program order are either committed prior to the transaction commit or have a store-mark on the cache line when the transaction commits. These rules guarantee that all reads and writes within the transaction can be placed (in program order) in the memory order when the transaction commits, without any intervening memory accesses from any other processors (or threads), thereby preserving transactional semantics. Specifically, when the transaction commits, all earlier (in program order) loads for which load-marks are held are placed in the memory order, then all earlier (in program order) stores for which store-marks are held are placed in the memory order, then all loads and stores within the transaction are placed in the memory order.

Embodiments of the present invention use the same rules to implement atomic instructions (such as read-modify-write) by viewing the load and store portions of the atomic as forming a (very short) transaction. Note that the rules do not require stores which are earlier than the atomic instruction to commit to the memory system before the atomic instruction commits. Rather, such earlier stores can simply hold their store-marks when the atomic instruction commits. As a result, processing atomic instructions does not require draining the store queue. Furthermore, embodiments of the present invention use the same rules to facilitate processor hardware executing speculatively and out-of-order. In other words, for these embodiments, hardware speculative execution is also viewed as a transaction.

Executing a Transaction

Figure 7:
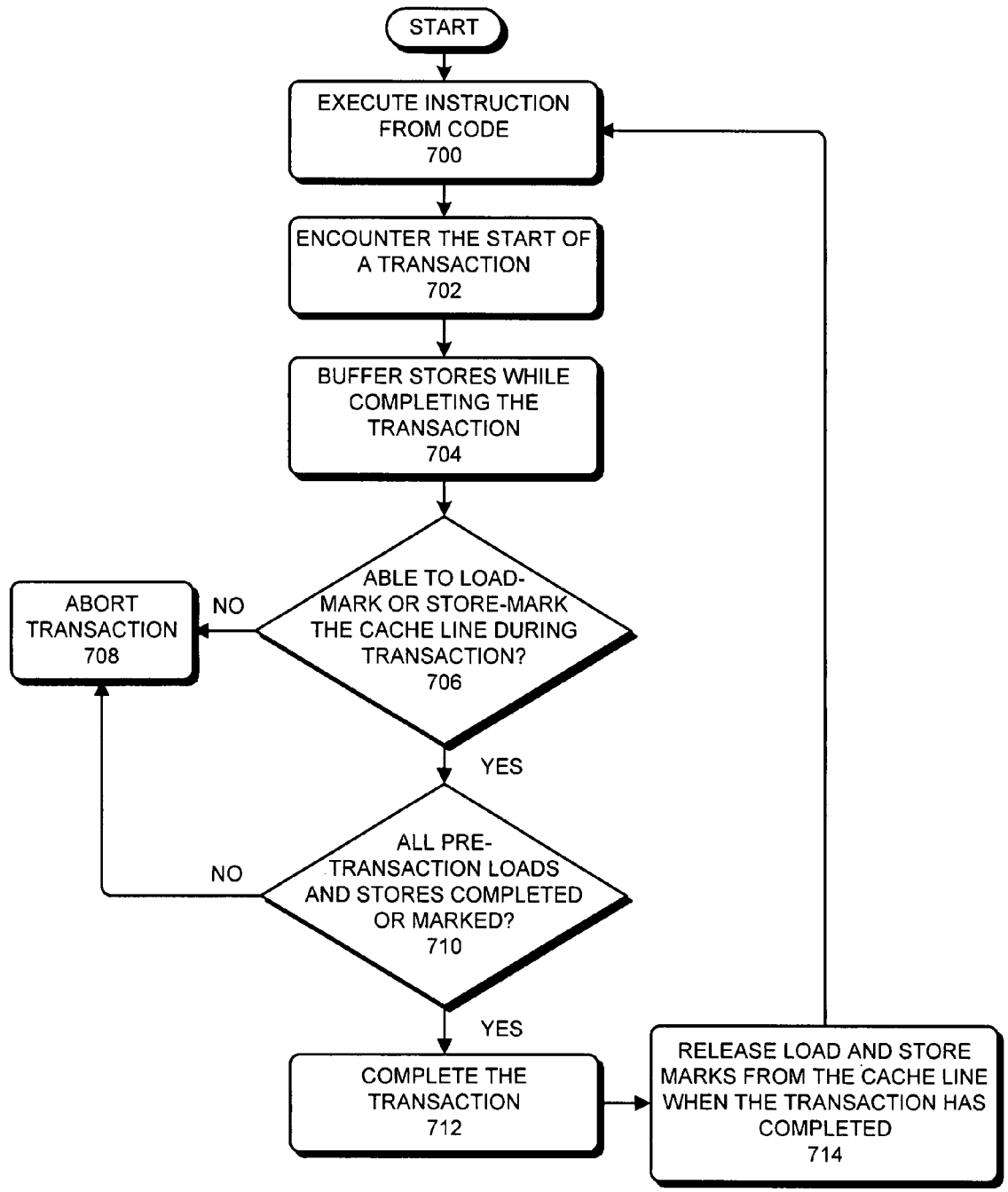
FIG. 7 presents a flow chart illustrating the process of performing a transaction in accordance with an embodiment of the present invention.

FIG. 7 presents a flow chart illustrating the process of performing a transaction in accordance with an embodiment of the present invention. The process starts with a thread executing instructions from program code (step 700).

The thread then encounters the start of a transaction (step 702). For example, the transaction can be initiated by a start transactional execution ("STE") instruction, which puts the thread in transactional-execution mode. For a more detailed explanation of starting transactional execution see U.S. patent application Ser. No. 10/637,166, entitled "Start Transactional Execution (STE) Instruction to Support Transactional Program Execution," by inventors Marc Tremblay, Quinn A. Jacobson and Shailender Chaudhry, filed on 8 Aug. 2003, which is hereby incorporated by reference to explain the process of starting transactional execution. Alternatively a transaction can be defined to be an atomic operation, in which case the start of the transaction can be indicated by an atomic instruction, such as a read-modify-write instruction. Furthermore, a transaction can be defined as hardware speculative execution, in which case the start of the transaction can be indicated by the entry to the hardware speculative execution episode.

Upon entering the transaction, the system switches the transaction state indicator to "transaction pending," takes a checkpoint of the architectural state of the strand, and commences buffering of store operations encountered during the transaction (step 704).

During the transaction, the thread attempts to place a load-mark on all cache lines read by the thread and a store-mark on all cache lines written by the thread (step 706). If the thread is unable to place a mark on a cache line, the transaction aborts (step 708). For example, if the transaction attempts to place a store-mark on a cache line that has already been load-marked or store-marked by another thread, the thread is unable to place the store-mark and the transaction aborts and the system restores the architectural state that was checkpointed at the start of the transaction.

Note that in order to protect marked cache lines from subsequent memory operations by other threads during the transaction, all load-marks and store-marks placed on cache lines during the transaction remain on the cache line until the transaction commits. In other words, the marking thread simultaneously holds all the load-marks and store-marks placed during the transaction when the transaction commits.

When the transaction has completed (as indicated by the completion of the atomic instruction, the return to non-speculative execution after a hardware speculative execution episode, or by the commit instruction at the end of transactional execution), the system prepares to commit the results of the transaction. Before committing the results of transactional execution, the system determines whether all loads that precede the transaction in program order have either been committed or have a read mark on a corresponding cache line. The system also determines whether all stores that precede the transaction in program order are either committed to memory prior to the transaction commit or have a store-mark on a corresponding cache line (step 710). If not, the transaction aborts (step 708).

Otherwise, because the pre-transaction loads and stores either commit before the transaction or hold a load-mark or store-mark on an associated cache line, all reads and writes within the transaction can be committed when the transaction completes without any intervening memory accesses from any other thread. In this case, the system commits the results of the transaction by completing the stores buffered during the transaction (step 712).

After committing the results of the transaction, the thread releases any load-marks and store-marks from any cache lines that were accessed during the transaction and returns the transaction state indicator to the "not-in-transaction" state (step 714). The system then returns to step 700 and continues to execute instructions from the program code.

Store-Queue-Overflow Mode and Repeating-Transaction Mode

Figure 8:
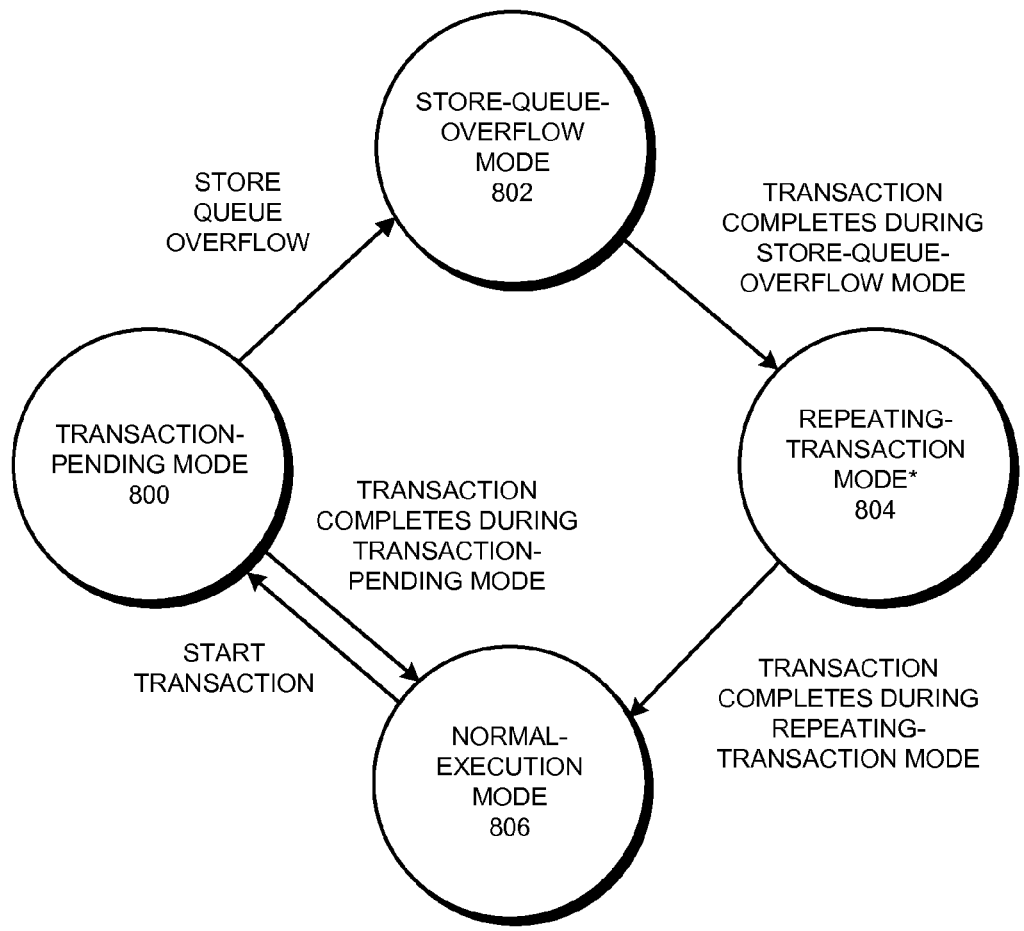
FIG. 8 presents a state diagram illustrating the transitions between transaction-pending mode, store-queue-overflow mode, and repeating-transaction mode in accordance with an embodiment of the present invention.

FIG. 8 presents a state diagram illustrating the transition between transaction-pending mode 800, store-queue-overflow mode 802, and repeating-transaction mode 804 in accordance with an embodiment of the present invention. The processor starts by executing instructions in normal-execution mode 806. Upon encountering a transaction, the processor changes its operating mode to transaction-pending mode 800 and begins to execute the transaction. If the processor completes the transaction successfully in transaction-pending mode 800, the processor logically commits the transaction and changes its operating mode back to normal-execution mode 806.

If the store queue overflows during transaction-pending mode 800, the processor changes its operating mode from transaction-pending mode 800 to store-queue-overflow mode 802. During store-queue overflow mode 802, the processor continues to execute the transaction and to place load and store-marks on the cache lines accessed by the transaction. Store data which does not fit within the store queue is simply discarded. Note that when a new store conflicts with old stores in the store queue, it is possible to discard either the new or old store, but it is preferable from a performance standpoint to discard the old store. If the processor succeeds in completing the transaction and placing all of the required load- and store-marks during store-queue-overflow mode 802, the processor then: (1) discards all of the transaction's stores (which have not already been discarded) from the store queue; (2) restores the register state and program counter (PC) from the start of the transaction; and (3) changes operating modes from store-queue-overflow mode 802 to repeating-transaction mode 804.

When operating in repeating-transaction mode 804, the processor is guaranteed to complete the transaction and thus the processor is able to apply stores within the transaction to the memory hierarchy. Once the transaction has been completed in repeated-transaction mode 804, the transaction logically commits, the load- and store-marks obtained by the transaction are removed, and the processor changes operating modes from repeating-transaction mode 804 to normal-execution mode 806. Because the stores can be applied to memory and removed from the store queue, there is no requirement that all of the transaction's stores fit into the store queue, and thus the store queue size does not constrain the transaction size. Also, note that loads within the transaction must see earlier stores within the transaction (as required for processor-consistency and TSO), and this requirement is satisfied even for stores that did not fit in the store queue because the loads can read the updated values from memory. Finally, note that no other processor can see the transaction's stores until the transaction commits and no other processor can write cache lines that are read within the transaction until the transaction commits, because all of the load- and store-marks required by the transaction are held until the transaction commits.

On the other hand, if a processor in store-queue-overflow mode 802 fails a transaction (e.g. due to a memory conflict with another processor or due to an overflow of its private buffer of cache line addresses that the processor has marked), the processor discards all of the transaction's stores (not already discarded) from the store queue, restores its register state from the start of the transaction, and jumps to a fail-program-counter (failPC) associated with the transaction.

RAW Hazard

For some embodiments of the present invention, there exists a case in which a processor operating in store-queue-overflow mode 802 cannot complete a transaction, even though there are no memory conflicts with other processors. This case occurs when one of the required load- or store-marks cannot be placed because the address of the load or store operation is unknown due to the discarding of stores from the store queue. Specifically, if a store S to a doubleword D is discarded from the store queue due to the overflow, and if a younger load L reads D, and if a load or store X is performed to an address that depends (directly or indirectly, via data or control dependency) on the value returned by load L, then the read or write mark required for X cannot be placed while in store-queue-overflow mode. As a result, in this case it is necessary to fail the transaction. Fortunately, as long as the store queue never contains a store to a given doubleword that is not the youngest store to that doubleword, this case can always be detected by hardware. In particular, whenever a processor in store-queue-overflow mode loads a value from a cache line on which the processor has placed a store-mark, but the processor does not detect a RAW bypass for the entire load value from the store queue, the processor must fail the transaction (this test can be made more precise by keeping a bit vector of the doublewords, or other units, within the cache line that have been written to within the transaction).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for executing a transaction on a multi-threaded processor, comprising:

executing the transaction in a transaction-pending mode, which involves placing load-marks or store-marks on cache lines loaded from or stored to during transaction-pending mode and also buffering store operations in a store queue;

upon encountering a store queue overflow, continuing to execute the transaction in a store-queue-overflow mode, which involves placing load-marks or store-marks on cache lines loaded from or stored to during store-queue-overflow mode and discarding store data which does not fit into the store queue during store operations; and upon completing the transaction in the store-queue-overflow mode, re-executing the transaction in a repeating-transaction mode, which executes the instructions in the transaction non-speculatively, and in doing so allows the store operations to commit to the memory hierarchy.

2. The method of claim 1, wherein transitioning to repeating-transaction mode involves discarding store operations from the store queue that were buffered during transaction-pending mode or store-queue-overflow mode and restoring a register state and a program counter (PC) from the start of the transaction.

3. The method of claim 1, wherein upon completing the transaction in repeating-transaction mode, the method further comprises removing the load-marks and store-marks placed on cache lines during transaction-pending mode and store-queue-overflow mode.

4. The method of claim 1, further comprising aborting the transaction by:

discarding stores in the store queue that are associated with transaction-pending mode or store-queue-overflow mode;

removing load-marks and store-marks from cache lines marked during transaction-pending mode or during store-queue-overflow mode; and commencing execution from a fail-program-counter associated with the transaction.

5. The method of claim 4, wherein the transaction is aborted if a load-mark or store-mark cannot be set on a cache line during transaction-pending mode or during store-queue-overflow mode.

6. The method of claim 4, wherein the method further comprises storing one or more addresses of load-marked and store-marked cache lines in a private buffer during transaction-pending mode and during store-queue-overflow mode and aborting the transaction if the private buffer overflows.

7. The method of claim 1, wherein discarding store data in store-queue-overflow mode involves discarding new store operations and retaining old store operations in the store queue.

8. The method of claim 1, wherein discarding store data in store-queue-overflow mode involves discarding old store operations from the store queue and saving new store operations in the store queue.

9. The method of claim 1, further comprising aborting the transaction during store-queue-overflow mode if a calculation of a destination address for a load operation or a store operation depends on a store operation that has been discarded.

10. The method of claim 1, wherein when a cache line is load-marked, no other thread can write to the cache line and wherein when a cache line is store-marked, no other thread can read from or write to the cache line.

11. An apparatus for executing a transaction, comprising:

a processor;

an execution mechanism on the processor;

wherein the execution mechanism is configured to execute the transaction in a transaction-pending mode, which involves placing load-marks or store-marks on cache lines loaded from or stored to during transaction-pending mode and also buffering store operations in a store queue;

wherein upon encountering a store queue overflow, the execution mechanism is configured to continue to execute the transaction in a store-queue-overflow mode, which involves placing load-marks or store-marks on cache lines loaded from or stored to during store-queue-overflow mode and discarding store data which does not fit into the store queue during store operations; and wherein upon completing the transaction in the store-queue-overflow mode, the execution mechanism is configured to re-execute the transaction in a repeating-transaction mode, which executes the instructions in the transaction non-speculatively, and in doing so allows the store operations to commit to the memory hierarchy.

12. The apparatus of claim 11, wherein when transitioning to repeating-transaction mode, the execution mechanism is configured to discard store operations from the store queue that were buffered while operating in transaction-pending mode or store-queue-overflow mode and restore a register state and a program counter (PC) from the start of the transaction.

13. The apparatus of claim 11, wherein upon completing the transaction in repeating-transaction mode, the execution mechanism is configured to remove the load-marks and store-marks placed on cache lines during transaction-pending mode and store-queue-overflow mode.

14. The apparatus of claim 11, wherein the execution mechanism is further configured to abort the transaction, wherein when aborting the transaction, the execution mechanism is configured to:
  discard stores in the store queue that are associated with transaction-pending mode or store-queue-overflow mode;
  remove load-marks and store-marks from cache lines marked during transaction-pending mode or during store-queue-overflow mode; and to
  commence execution from a fail-program-counter associated with the transaction.

15. The apparatus of claim 14, wherein the execution mechanism is configured to abort the transaction if a load-mark or store-mark cannot be set on a cache line during transaction-pending mode or during store-queue-overflow mode.

16. The apparatus of claim 14, wherein the execution mechanism is configured to store one or more addresses of load-marked and store-marked cache lines in a private buffer during transaction-pending mode and during store-queue-overflow mode and to abort the transaction if the private buffer overflows.

17. The apparatus of claim 11, wherein when discarding store data in store-queue-overflow mode, the execution mechanism is configured to discard new store operations and retain old store operations in the store queue.

18. The apparatus of claim 11, wherein when discarding store data in store-queue-overflow mode, the execution mechanism is configured to discard old store operations from the store queue and save new store operations in the store queue.

19. The apparatus of claim 11, wherein the execution mechanism is further configured to abort the transaction during store-queue-overflow mode if a calculation of a destination address for a load operation or a store operation depends on a store operation that has been discarded.

20. The apparatus of claim 11, wherein when a cache line is load-marked, no other thread can write to the cache line and wherein when a cache line is store-marked, no other thread can read from or write to the cache line.

21. A computer system for executing a transaction, comprising:
  a processor;
  an execution mechanism on the processor;
  a memory coupled to the processor, wherein the memory stores data and instructions for the processor;
  wherein the execution mechanism is configured to execute the transaction in a transaction-pending mode, which involves placing load-marks or store-marks on cache lines loaded from or stored to during transaction-pending mode and also buffering store operations in a store queue;
  wherein upon encountering a store queue overflow, the execution mechanism is configured to continue to execute the transaction in a store-queue-overflow mode, which involves placing load-marks or store-marks on cache lines loaded from or stored to during store-queue-overflow mode and discarding store data which does not fit into the store queue during store operations; and
  wherein upon completing the transaction in the store-queue-overflow mode, the execution mechanism is configured to re-execute the transaction in a repeating-transaction mode, which executes the instructions in the transaction non-speculatively, and in doing so allows the store operations to commit to the memory hierarchy.

* * * * *

UNITED STATES PATENT AND TRADEMARK OFFICE
CERTIFICATE OF CORRECTION

| | | |
|---|---|---|
| PATENT NO. | : 7,739,456 B1 | Page 1 of 1 |
| APPLICATION NO. | : 11/715312 | |
| DATED | : June 15, 2010 | |
| INVENTOR(S) | : Robert E. Cypher et al. | |

It is certified that error appears in the above-identified patent and that said Letters Patent is hereby corrected as shown below:

On the Title pg. Item (57) in "Abstract", line 7, delete "store queue overflow" and insert -- store-queue-overflow --, therefor.

In column 1, line 62, delete "store queue overflow" and insert -- store-queue-overflow --, therefor.

In column 12, line 46, delete "store queue overflows" and insert -- store-queue-overflows --, therefor.

In column 12, line 49, delete " store-queue overflow" and insert -- store-queue-overflow --, therefor.

In column 14, line 6, in claim 1, delete "store queue overflow" and insert -- store-queue-overflow --, therefor.

In column 15, line 7, in claim 11, delete "store queue overflow" and insert -- store-queue-overflow --, therefor.

In column 16, line 36, in claim 21, delete "store queue overflow" and insert -- store-queue-overflow --, therefor.

Signed and Sealed this
Twenty-sixth Day of July, 2011

David J. Kappos
*Director of the United States Patent and Trademark Office*